Aug. 21, 1951 A. LISSIANSKY 2,565,035

PHONOGRAPHIC RECORD DISK

Filed July 5, 1947 2 Sheets-Sheet 1

INVENTOR
ALEXANDER LISSIANSKY
BY Edwin Leisohn
ATTORNEY

PHONOGRAPHIC RECORD DISK

Filed July 5, 1947 2 Sheets-Sheet 2

INVENTOR
ALEXANDER LISSIANSKY
BY Edwin Leisohn
ATTORNEY

Patented Aug. 21, 1951

2,565,035

UNITED STATES PATENT OFFICE 2,565,035

PHONOGRAPHIC RECORD DISK

Alexander Lissiansky, Bronx, N. Y., assignor to International Mutoscope Corporation, Long Island City, N. Y., a corporation Application July 5, 1947, Serial No. 759,153

5 Claims. (Cl. 274—42)

This invention relates to phonographic records, and more particularly to record blanks which are to bear recordings.

It is the primary aim and object of the present invention to provide record blanks which are adapted for use in the voice recording and reproducing apparatus shown and described in my co-pending application, Serial Number 759,152, filed of even date herewith.

Accordingly, it is an important object of the present invention to provide record blanks which are to become integral elements of the referred apparatus, by providing for their interlock with parts of the apparatus from the moment they are placed in a supply magazine of the latter until they are about to be ejected from the apparatus as finished recordings.

It is another important object of the present invention to make provisions in the record blanks for adapting them for cooperation with the specific record-releasing mechanism in the magazine of the referred apparatus.

The above and other objects, features and advantages of the present invention will be more fully understood from the following description considered in connection with the accompanying illustrative drawings.

Figures 3, 4, 5, 6:
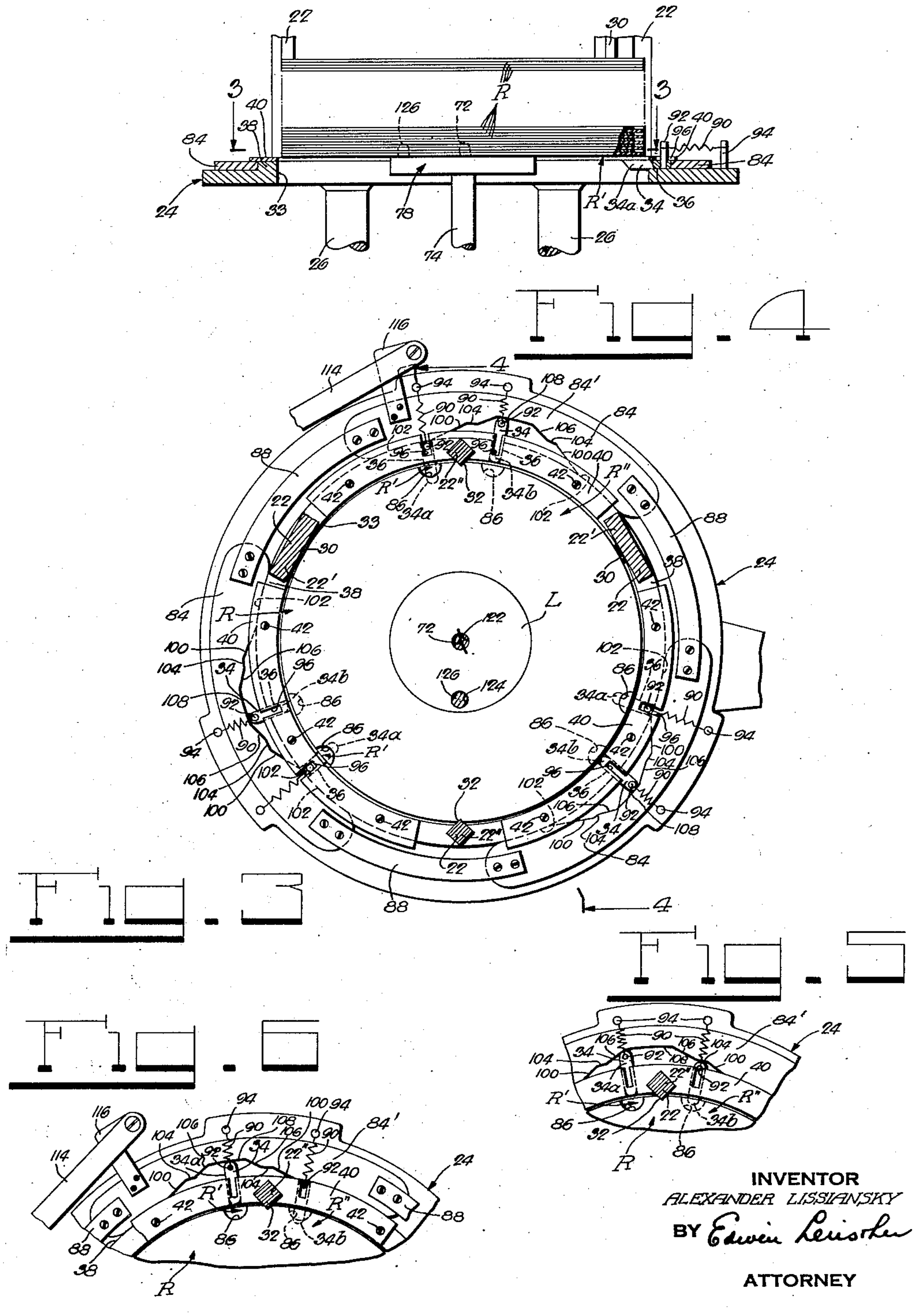
Fig. 3 is a horizontal section through a magazine in which blanks of the present type may be stacked, the magazine shown being that of the referred apparatus, and the section being taken on the line 3—3 of Fig. 4.
Fig. 4 is a section taken substantially on the line 4—4 of Fig. 3.

Figs. 5, and 6 are fragmentary sections similar to Fig. 3, and showing different steps in the release of a record blank from the magazine.

Figure 1:
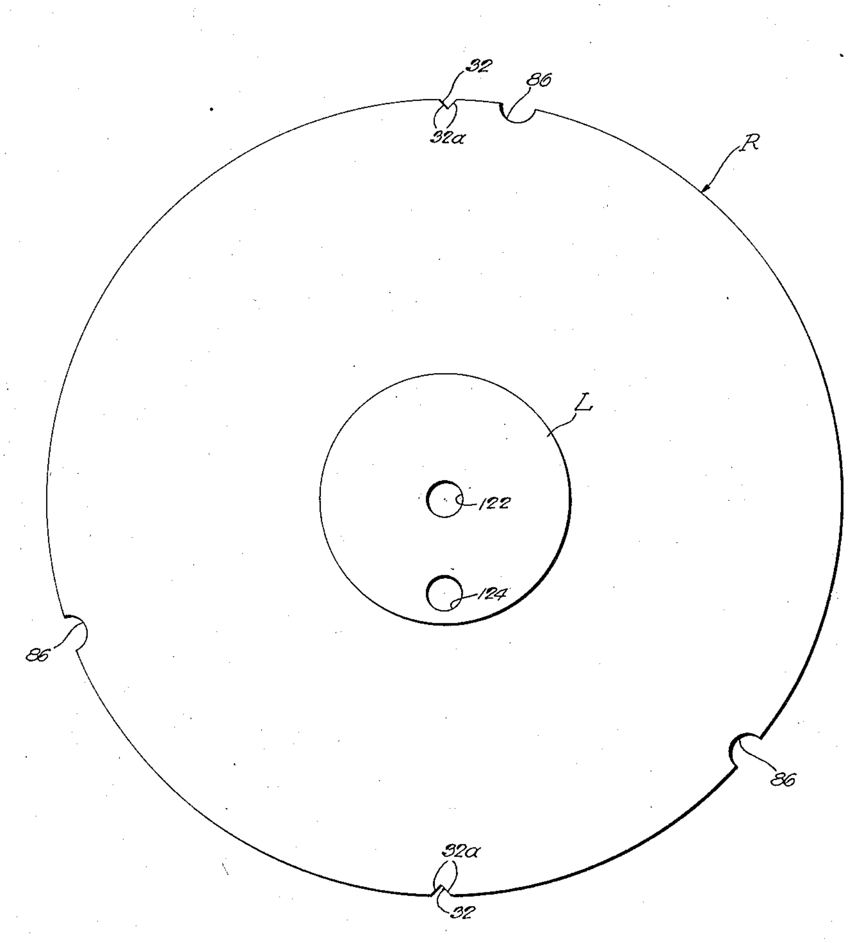
Fig. 1 is a plan view of a record blank embodying the present invention.
Figure 2:
Fig. 2 is an edge view of the same record blank.

Referring to the drawings, and more particularly to Figs. 1 and 2 thereof, the present record blank R is in the usual form of a round disc which may be of any suitable record material. Preferably, the material from which the blank R is made is, for reasons hereinafter apparent, sufficiently resilient to permit slight flexing of the blank without causing permanent deformation of the same. A material suitable for this purpose is pressed cardboard, for instance.

Either face, and preferably both faces, of the blank R bear coatings of any material customarily used in which to cut the spiral sound groove of the record to be made. The coating material preferred on the present blank may be any one of several well-known plastic compounds.

Referring now to Figs. 3 and 4, there is shown a magazine in which blanks R of the present type may be stacked. The magazine shown is that of my referred apparatus, and comprises several, in the present instance four, upright bars 22 on a ring support or platform 24 which is mounted above a main support or table (not shown) on upright posts 26. The bars 22 are paired into guide bars 22′ and locking bars 22″, and are so arranged as to confine a supply stack of superposed blanks R in the manner shown in Fig. 3. The guide bars 22′ may be provided with wear strips 30 which engage or slightly clear the peripheries of the stacked blanks R, while the locking bars 22″, which are, in the present instance, disposed diametrically opposite to each other, may be of any suitable cross section, and are so spaced from each other, as to be registerable with diametrically opposite peripheral lock notches 32 in the stacked blanks R (Figs. 1 and 3). In the present instance, the locking bars 22″ are of square cross section, and the lock notches 32 in the blanks R are accordingly V-shaped with the walls 32*a* thereof forming angles of at least 90°.

The central opening 33 in the ring support 24 is sufficiently large to permit the passage therethrough of the blanks R from the magazine. The stacked blanks in the magazine are normally supported, except as hereinafter pointed out, on a disc 78 in the manner shown in Fig. 4. The disc or "transfer table" 78 is carried by a vertically reciprocable spindle 74 which, for the transfer by said disc 78 of a blank R from the magazine onto a turntable therebelow (not shown), is lowered into a position in which the transfer table becomes seated in a central recess in the turntable and the record blank carried thereon comes to rest on the turntable. While the transfer table 78 performs its referred blank-transfer function, the stacked blanks R in the magazine are supported on fingers 34 which are radially movable into and from the central opening 33 in the ring support 24 in guideways 36, provided in a raised annular shoulder 38 on the ring support (Figs. 3 and 4). The fingers 34 are held in their respective guideways 36 by arcuate retainers 40 which are suitably secured to the ring support 24 as by screws 42, for instance. The guide bars 22′ and the locking bar 22″ nearest thereto are preferably permanently mounted on the ring support 24, while the remaining or "front" locking bar 22'' is preferably removably mounted in any suitable manner on the ring support 24 so as to permit facile placement of a stack of blanks R into the magazine from the side thereof. In placing blanks R into the magazine from the side thereof, it is, of course, imperative that the lock notches 32 in the blanks are aligned with each other and brought into registry with the locking bars 22'', as the removable locking bar could otherwise not be remounted in the magazine.

The transfer of a blank R from the magazine onto the turntable therebeneath is accomplished in two steps, namely, by releasing the lowermost blank in the magazine for discharge therefrom, and by lowering the released blank onto the turntable. The release of the lowermost blank R in the magazine is accomplished by certain operation of the fingers 34 (Figs. 3 to 6), while the lowering of a released blank onto the turntable is accomplished by the transfer table 78, as previously mentioned.

In order that the fingers 34 may perform, in each operating cycle of the referred apparatus, their primary function of releasing the lowermost blank in the magazine for discharge therefrom, the fingers 34 are arranged in angularly spaced pairs of which the fingers 34a and 34b of each pair are under the control of a preferably separate arcuate cam 84 which is so designed and operated as alternately to move the fingers 34a and 34b into and from the central opening 33 in the ring support 24 of the magazine.

Further, proper blank-releasing performance of the fingers 34 requires additional peripheral notches 86 in the blanks (see also Fig. 1). In the present instance, there are provided three equi-angularly spaced pairs of identically constructed and coordinated fingers 34a and 34b, and the blanks R are accordingly provided with three equi-angularly spaced peripheral notches 86. The notches 86 are shown half-round, but they may assume any other suitable shape. The separate operating cams 84 for the respective finger pairs are also identical, and are joined by arcuate straps 88 (Fig. 3) so that the cams 84 form parts of an articulated ring which is journaled on the raised annular shoulder 38 of the ring support 24, preferably through intermediation of anti-friction discs (not shown) which may be received in suitable sockets in the cams 84 and ride on the annular shoulder 38. The outer margins of the arcuate retainers 40 overlap the cams 84 (Figs. 3 and 4) and prevent removal of the latter from the ring support 24.

The fingers 34a and 34b of the several pairs are urged into permanent engagement with their respective cams 84 by springs 90, which are anchored with one end on studs 92 on the fingers 34, and with their other ends on studs 94 on the ring support 24. The arcuate retainers 40 are radially slotted at 96 to admit the studs 92 on the fingers 34 when the latter advance into the central opening 33 in the ring support 24 of the magazine.

In order that the fingers 34 may perform their designated blank-releasing function, it is further required that identical blanks R are stacked in the magazine in alternately inverted relation to each other, so that identical notches 86 in successive blanks are staggered in the manner indicated in Fig. 3, and each peripheral notch 86 in a stacked blank R is covered on both sides by non-notched peripheral portions of adjacent blanks (Fig. 4).

In loading the magazine, blanks R are so placed therein that non-notched peripheral portions of the lowermost blank R' are directly above the presently advanced fingers 34a as shown in Figs. 3 and 4. Since the action of the separate cams 84 on their respective fingers 34a, 34b is the same for the release of the lowermost blank R' in the magazine, the action of only one of these cams, namely 84', will now be described with particular reference to Figs. 3, 5 and 6. In Fig. 3, the advanced finger 34a adjacent cam 84' extends beneath a non-notched peripheral portion of the lowermost blank R' in the magazine, while the associated finger 34b is completely retracted. To release the lowermost blank R', cam 84' is turned counterclockwise from the position shown in Fig. 3 into that shown in Fig. 5, whereby the finger 34a is completely retracted and clears the periphery of the blank R', while the associated finger 34b is advanced sufficiently to extend beneath a non-notched peripheral portion of the second-lowest blank R'' in the magazine, but will clear the lowermost blank R' due to its partial extensions into the adjacent notch 86 therein. Hence, the lowermost blank R' is now released from the magazine and may descend with the transfer table 78 on which it rests.

In my referred apparatus, the transfer table 78 is, on the described release of the lowermost blank R' from the magazine, lowered, permitting thereby the remaining blanks in the magazine to gravitate onto the partially advanced finger 34b (Fig. 5) and become seated thereon. More particularly, it is a non-notched peripheral portion of the then lowermost blank R'' which becomes seated on the presently partially advanced finger 34b (Fig. 5). In reality, the transfer table 78 is, on the release of the lowermost blank R' from the magazine, initially lowered from its blank-supporting position (Fig. 4) such a distance that the remaining, slightly flexible blanks in the magazine become seated on the partially advanced fingers 34b, as above explained, and are furthermore permitted to sag in the center under their own weight and, if need be, that of an additional weight (not shown) on top of the stacked blanks, thereby causing a clear separation of the periphery of the released blank R' from that of the nearest blank R'' in the magazine, all as shown and described in my referred copending application. While the transfer table 78 is thus held in the initial lowered position, cam 84' is further turned counter-clockwise from the position shown in Fig. 5 to that shown in Fig. 6, causing thereby the finger 34a to remain in its retracted position, while moving the finger 34b to its most advanced position in which it enters and wedges between the released blank R' on the transfer table 78 and the nearest blank R' in the magazine, flexing thereby the adjacent peripheral portion of the released blank R' beneath the supporting plane of the transfer table 78. The released blank R' thus flexed or deformed is permitted to recover its original flat shape when the transfer table 78 is further lowered from its described initial lowered position for the transfer of said blank R' onto the turntable. The released blank R' will, while recovering from its deformation, spring completely away from the nearest blank R'' in the magazine and thus carry the initial separation of the blanks R' and R'' at the peripheries thereof to a never-failing final conclusion.

In order that the fingers 34 may perform the above-described dual function of releasing the lowermost blank from the magazine and positively separating the same from the remaining blanks therein, the identical cams 84 are designed as shown in Figs. 3, 5 and 6. More particularly, each cam 84 has opposite inclined edges 100 which lead inwardly from the inner concentric edge 102 thereof to short dwells 104, respectively, and opposite inclined edges 106 which lead from the dwells 104, respectively, to a long dwell 108. Each cam 84 is so coordinated with its associated fingers 34a and 34b that either finger is in its most advanced position when in engagement with the inner concentric edge 102 of the cam, is completely retracted and clears the outer periphery of the adjacent blank in the magazine when in engagement with the innermost dwell 108 of the cam, and is in the partially advanced position shown at 34b in Fig. 5 when in engagement with either one of the intermediate dwells 104 in the cam.

While the cams 84 are turned counter-clockwise as viewed in Figs. 3, 5 and 6 for the above-described release of the lowermost blank R′ from the magazine and its separation from the remaining blanks therein, it will now be evident that the cams 84 are turned in the opposite direction for the subsequent release of the then lowermost blank R″ from the magazine and its separation from the remaining blanks therein. Hence, the cams 84 have to be oscillated back and forth about the central axis of the magazine for the release of the successive blanks R in the magazine. The cams 84 are thus oscillated, through intermediation of a link 114 and an arm 116 on one of the cams 84, by mechanism fully shown and described in my referred copending application.

It is also contemplated to make the record blanks R integral elements of my referred apparatus during their presence in, and travel through, the latter, by interlocking them with parts of the apparatus from the moment they are placed in the magazine until they are about to be ejected from the apparatus as finished recordings. Thus, the blanks R in the magazine are interlocked with the locking bars 22″ thereof, as explained.

Furthermore, each blank R has, besides a center hole 122 for the reception of a center pin 72 on the transfer table 78, also a dowel hole 124. As shown in Fig. 1, the dowel hole 124 in each blank R is in line with the diametrically opposite lock notches 32 therein, wherefore the dowel holes 124 in the stacked blanks in the magazine are all axially aligned despite the alternately inverted disposition of successive blanks therein. The dowel holes 124 in the stacked blanks are adapted to receive a dowel pin 126 on the transfer table 78 (Fig. 4), and thus become locked to the latter prior to and during their release from the magazine, as well as during their transfer onto, and stay on, the turntable. The dowel pin 126 on the transfer table 78 serves also to interlock a transferred blank R with the turntable through intermediation of a driving pin (not shown) in the latter which engages a suitable socket (not shown) in the transfer table 78 and drives the latter when in its lowermost position. Suitable provisions, shown and described in my referred co-pending application, are made to arrest the transfer table 78, when not in driving engagement with the turntable, in a predetermined angular position in which the dowel pin 126 thereon will, on ascent of the transfer table 78 to its blank-supporting position (Fig. 4), enter unfailingly the aligned dowel holes 124 of the lowest blanks in the magazine. Thus, the blanks R are interlocked with parts of my referred apparatus not only while they are in the magazine, but also while they are being transferred onto the turntable and even when they turn thereon.

Due to the explained alternately inverted disposition of the stacked blanks in the magazine for their correct placement therein, both faces of the identical blanks R are preferably coated. It is, of course, feasible to coat only one face of each blank, in which case two separate supplies of blanks are coated on different faces thereof so as to permit their correct placement in the magazine in alternately inverted relation to each other. To facilitate the proper placement of single-face coated blanks R in the magazine, so that they are alternately inverted to each other with their coated faces up, they are preferably provided on their coated faces only with labels L of paper or the like, which may be cemented or otherwise secured thereto. Labels L may, of course, be also provided on records having both faces coated. The labels L may bear any desired printed matter.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. A circular phonographic record disc having two spaced first and second holes in a central portion thereof, at least three first identical peripheral notches arranged at points constituting a three-point positive support for said disc, and a differently shaped second peripheral notch in line with said holes and unequally angularly spaced from the adjacent first notches and out of diametric alignment with the remaining first notch, so that said first notches in each of a plurality of identical record discs are covered by non-notched peripheral portions of the adjacent record discs on stacking said discs in alternately inverted order into superposed relation with each other with their second notches, first holes and second holes in alignment with each other, respectively.

2. A circular phonographic record disc having two spaced first and second holes in a central portion thereof, at least three first identical peripheral notches arranged at points constituting a three-point positive support for said disc, and two diametrically opposite second peripheral notches in line with said holes, said second notches being differently shaped than said first notches and unequally angularly spaced from the adjacent first notches, respectively, so that said first notches in each of a plurality of identical record discs are covered by non-notched peripheral portions of the adjacent record discs on stacking said discs in alternately inverted order into superposed relation with each other with their diametrically opposite second notches, first holes and second holes in alignment with each other, respectively.

3. A circular phonographic record disc having two spaced first and second holes in a central portion thereof of which one hole is in the center of the disc, at least three first identical peripheral notches arranged at points constituting a three-point positive support for said disc, and two diametrically opposite second peripheral notches in line with said holes, said second notches being differently shaped than said first notches and unequally angularly spaced from the adjacent first notches, respectively, so that said first notches in each of a plurality of identical record discs are covered by non-notched peripheral portions of the adjacent record discs on stacking said discs in alternately inverted order into superposed relation with each other with their diametrically opposite second notches, first holes and second holes in alignment with each other, respectively.

4. A circular phonographic record disc having two spaced first and second holes in a central portion thereof of which one hole is in the center of the disc, at least three equi-angularly spaced first identical peripheral notches, and a differently shaped second peripheral notch in line with said holes and unequally angularly spaced from the adjacent first notches, so that said first notches in each of a plurality of identical record discs are covered by non-notched peripheral portions of the adjacent record discs on stacking said discs in alternately inverted order into superposed relation with each other with their second notches, first holes and second holes in alignment with each other, respectively.

5. A circular phonographic record disc having two spaced first and second holes in a central portion thereof of which one hole is in the center of the disc, at least three first equi-angularly spaced, identical peripheral notches, and two diametrically opposite second peripheral notches in line with said holes, said second notches being unequally angularly spaced from the adjacent first notches, respectively, and being differently shaped than said first notches, so that said first notches in each of a plurality of identical record discs are covered by non-notched peripheral portions of the adjacent record discs on stacking said discs in alternately inverted order into superposed relation with each other with their diametrically opposite second notches, first holes and second holes in alignment with each other, respectively.

ALEXANDER LISSIANSKY.

REFERENCES CITED

The following references are of record in the file of this patent:

UNITED STATES PATENTS

| Number | Name | Date |
|---|---|---|
| 1,316,894 | Holmboe | Sept. 23, 1919 |
| 1,409,568 | Pakeman | Mar. 14, 1922 |
| 1,665,331 | Thomson | Apr. 10, 1928 |
| 1,955,497 | Harvey | Apr. 17, 1934 |
| 2,020,381 | Labowitz et al. | Nov. 12, 1935 |
| 2,027,426 | Hammond et al. | Jan. 14, 1936 |
| 2,250,140 | Shuemaker | July 22, 1941 |

FOREIGN PATENTS

| Number | Country | Date |
|---|---|---|
| 334,003 | Great Britain | Aug. 28, 1930 |